(12) United States Patent
Yang

(10) Patent No.: US 7,242,663 B2
(45) Date of Patent: Jul. 10, 2007

(54) MULTI-CHANNEL SPREAD SPECTRUM COMMUNICATIONS SYSTEM

(75) Inventor: George L. Yang, 15 Longfellow Ct., Freehold, NJ (US) 07728

(73) Assignee: George L. Yang, Owings Mills, MD (US)

( * ) Notice: Subject to any disclaimer, the term of this patent is extended or adjusted under 35 U.S.C. 154(b) by 1039 days.

(21) Appl. No.: 10/174,768

(22) Filed: Jun. 19, 2002

(65) Prior Publication Data

US 2003/0235148 A1      Dec. 25, 2003

(51) Int. Cl.
*H04J 11/00*      (2006.01)
(52) U.S. Cl. ............ 370/206; 370/208; 370/329; 370/335
(58) Field of Classification Search ............ 370/206, 370/335, 342, 208, 329; 375/140, 141, 143, 375/146, 147, 152

See application file for complete search history.

(56) References Cited

U.S. PATENT DOCUMENTS

| | | | |
|---|---|---|---|
| 6,324,209 B1* | 11/2001 | Li et al. | 375/146 |
| 6,937,641 B2* | 8/2005 | Li et al. | 375/141 |
| 2004/0001534 A1* | 1/2004 | Yang | 375/143 |

* cited by examiner

*Primary Examiner*—Hassan Kizou
*Assistant Examiner*—Brian T O'Connor

(57) ABSTRACT

A multi-channel spread spectrum communications system utilizes the combination of spreading codes to represent and transfer information. On the transmitter side, every block of data bits is divided into two sub-blocks of data bits. One sub-block is mapped to a number of spreading codes, while another sub-block is separated further into several smaller sub-blocks with each of them mapped into an M-ary phase. Each selected spreading code is modulated by the corresponding M-ary phase. On the receiver side, first determine the most likely transmitted spreading codes and their respective phases, then reverse map the set of estimated transmitted spreading codes into a block of bits and each of the phases into another block of data bits, and finally combine all these blocks to a single block of data bits.

20 Claims, 3 Drawing Sheets

MULTI-CHANNEL SPREAD SPECTRUM COMMUNICATIONS SYSTEM

FEDERALLY SPONSORED RESEARCH

Not Applicable

SEQUENCE LISTING OR PROGRAM

Not Applicable

FIELD OF THE INVENTION

The invention relates generally to multi-channel direct sequence spread spectrum communications system, and more particularly to using the elements of the power set of the set of spreading sequences to represent and transmit information in order to achieve a higher data rate without requiring more precision on A/D converter and more linearity on linear power amplifier.

BACKGROUND

Spread spectrum is a method of modulation that needs a transmission bandwidth usually substantially higher than data rate. In a direct sequence spread spectrum communications system, the transmitter modulates a data signal with a pseudo random chip sequence to generate spread spectrum signal. Usually the chip rate of the pseudo random sequence is much higher than the data rate and therefore the direct sequence spread spectrum communications system will take substantially wider bandwidth than the bandwidth needed by data signal itself. The spread spectrum signal is then transmitted over a communications media as a radio wave to a receiver. The receiver despreads the spread spectrum signal to recover the information contained in the received spread spectrum signal.

Having many advantages over other communications systems, direct sequence spread spectrum communications system is one of the major communications systems widely used in today's society. However, spread spectrum communications system has some disadvantages. One of the major disadvantages is low spectrum efficiency. Nowadays more and more applications require higher and higher data rate but the available bandwidth is both very expensive and limited. The low spectrum efficiency inherited in a spread spectrum communications system will greatly restrict its opportunity to be used in many high data rate applications.

Multi-channel direct sequence spread spectrum communications system is one of the attempts to increase the data rate within a given bandwidth and therefore to improve the spectrum efficiency of direct sequence spread spectrum communications system. However, in a regular multi-channel direct sequence spread spectrum communications system, the more channels, the more different signal levels. In order to have enough resolution, more linear power amplifier and higher precision A/D converter will be needed. Both of these factors will make cost greatly increased especially when the working clock is very high.

U.S. Pat. No. 6,324,209 to Don Li et al, herein incorporated by reference, disclosed a method of applying multi-channel technology in direct sequence spread spectrum communications system. Different from regular multi-channel direct sequence spread spectrum communication system in which each sub-channel transmits information simultaneously, U.S. Pat. No. 6,324,209 separated spreading codes into several subgroups and at any time, transmitted only one spreading code from each subgroup. In this way, it limited the possible number of signal levels and therefore the requirement on both A/D and linear power amplifier was under control. However, the data rate was still not high enough. In some case, it can not meet the requirements such as reasonable cost and limited transmission bandwidth set up by more and more high data rate applications.

Therefore, there is a need to further increase the spectrum efficiency of a multi-channel direct sequence spread spectrum communications system without increasing the requirement on linear power amplifier and A/D converter.

In a regular communications system, the information is represented and transmitted directly by each transmittable signal. Let S be the set of all these transmittable signals. The power set of the set S is a set denoted by $2^S$, whose elements are the subsets of S. In other words, $2^S = \{X | X \subseteq S\}$. If there are L components in S, then there will be $2^L$ elements in the power set $2^S$.

Suppose in a regular communications system, each element of S can carry 1 bit information. By transmitting all of the elements of S, one can send L bits information.

One can also send L bits information by alternative. Due to the fact there are $2^L$ elements in the power set $2^S$, one can correspond each element of the power set $2^S$ to a different L bits binary number. Since there are $C_L^i$ elements in $2^S$ with each element consisting of i components from set S, the element of $2^S$ on average consists of $$\left(\sum_{i=0}^{L} i \cdot C_L^i\right) / 2^L = L/2$$

components from set S. In this alternative way, instead of transmitting L signals all the time, one can, on average, transmit only half of L signals.

Furthermore, instead of using all the elements of a power set to transmit information, one can use a particular subset of the power set to transmit information.

SUMMARY OF THE INVENTION

This invention is based on the fact that the number of the elements in the power set of a set is more than the number of the components in the set.

The primary objective of the invention is to achieve a multi-channel direct sequence spread spectrum communications system with a higher data rate without further requirement on linear power amplifier and A/D converter.

Another objective of the invention is to represent and transmit information by the elements of the power set of the set of spreading sequences instead of spreading sequences themselves.

BRIEF DESCRIPTION OF THE DRAWINGS

The drawing figures depict preferred embodiments of the present invention by way of example, not by way of limitations. In the figures, like reference numerals refer to the same or similar elements.

DETAILED DESCRIPTION OF THE PREFERRED EMBODIMENTS

Detailed description of the preferred embodiment is provided herein. The embodiment illustrates a multi-channel direct sequence spread spectrum communications system. However, it is to be understood that the present invention may be embodied in many different ways. For those skilled in the art, it may be easy to modify the embodiment. For example, instead of using phase mapping device, one can use quadrature amplitude modulation (QAM) or pulse amplitude modulation (PAM). Therefore, specific details disclosed are not to be interpreted as limiting, but rather as a basis for the claims and as a representative basis for teaching one to employ the present invention in virtually any appropriately detailed system, structure or manner.

The principles described here can be easily deployed in other multi-channel communication systems. For instances, one skilled in the art can apply the principles in a communication system with the capability to transmit signals at multiple frequencies simultaneously or in a communication system with the capability to transmit signals at multiple time slots. One skilled in the art can further apply the principles in a communication system involved with time domain, frequency domain, and code domain simultaneously. For example, one can define a mapping scheme between a block of data bits and a subset of the power set based on available frequency points and time slots.

Figure 1:
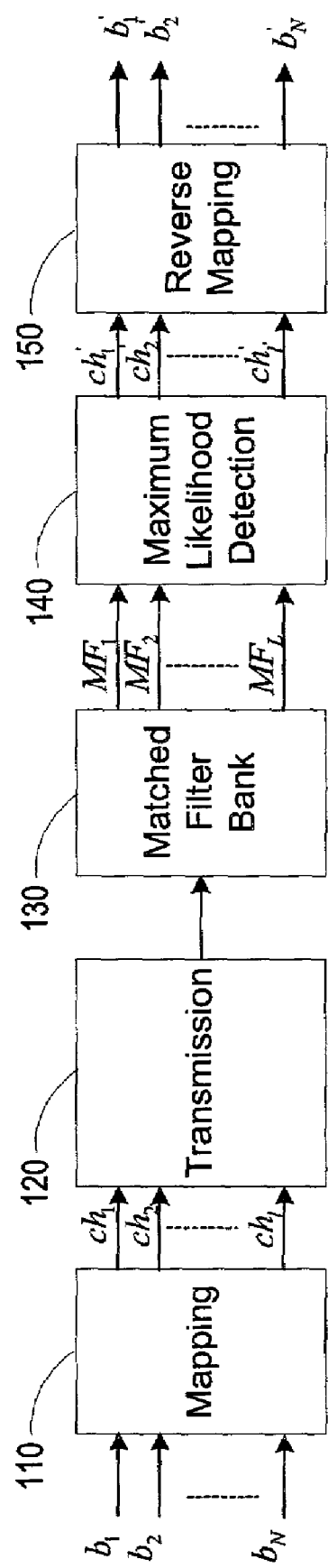
FIG. 1 is a block diagram of a communications system implementing the concept of power set.

FIG. 1 illustrates the general structure of a communications system transmitting information by the elements of a power set of the set of transmittable signals. For a set S having L components, the power set of the set S will have $2^L$ elements. Each element in the power set is a subset of the set S, consisting of 0 to L components from the set S. The huge difference between the number of components in a set and the number of elements in the power set of the set makes it possible on average to transmit more information under same or similar transmission conditions.

Suppose that there are N bits $b_1, b_2, \ldots, b_N$ to be transmitted and suppose that there are L codes in the set S. Let's arrange these L codes into order and call them $code_1, code_2, \ldots, code_L$. The power set $2^S$ of the set S is the set of all subset of the set S. The elements of the power set of the set S consist of none, some or all of the codes from $code_1, code_2, \ldots, code_L$.

The mapping device 110 maps a different block of N data bits $b_1, b_2, \ldots, b_N$ into a different element of the power set $2^S$. Let the mapping device 110 map a particular block of N data bits $b_1, b_2, \ldots, b_N$ into $ch_1, ch_2, \ldots, ch_l$, an element of the power set $2^S$, where $ch_i \neq ch_j$ if $i \neq j$, $ch_i = code_{i'}$, for $1 \leq i \leq l \leq L$ and $1 \leq i' \leq L$, and $i' < j'$ for $ch_i = code_{i'}$, $ch_j = code_{j'}$, and $i < j$. The mapping is always possible as long as $N \leq L$.

$ch_1, ch_2, \ldots, ch_l$ are transmitted through the transmission mechanism 120, which may include RF modulation, power amplifier and transmitting antenna at transmitter side and receiving antenna, low noise amplifier, automatic gain control and frequency down converted device at receiver side.

The output of transmission is connected to a matched filter bank 130. There are L matched filters in the bank with each one matching to one of signals represented by $code_1, code_2, \ldots, code_L$.

The maximum likelihood detection 140 determines which codes among $code_1, code_2, \ldots, code_L$ are most likely transmitted at the transmitter side. In other words, to determine $ch'_1, \ldots, ch'_{l'}$. This detection could be carried out under some conditions such as false alarm probability and detection probability as well as some precondition on $ch_1, ch_2, \ldots, ch_l$.

The reverse mapping device 150 is used to find the likely transmitted bits $b'_1, \ldots, b'_N$ once $ch'_1, \ldots, ch'_{l'}$ have been determined. If there is no mistake, $b'_1, \ldots, b'_N$ should be identical to $b_1, b_2, \ldots, b_N$.

By properly arranging a mapping scheme between messages, which correspond to different blocks of data bits, and elements of the power set, one can make more efficient use of the scheme depicted in FIG. 1. For example, if every active component has a same power, by making a message having higher probability represented by an element of the power set with less components then on average, one can save power. If the total power for every element of the power set has a same power, by making an important message associated with an element of the power set with less components, then on average, one can enhance the probability to detect correctly the message.

Figure 2:
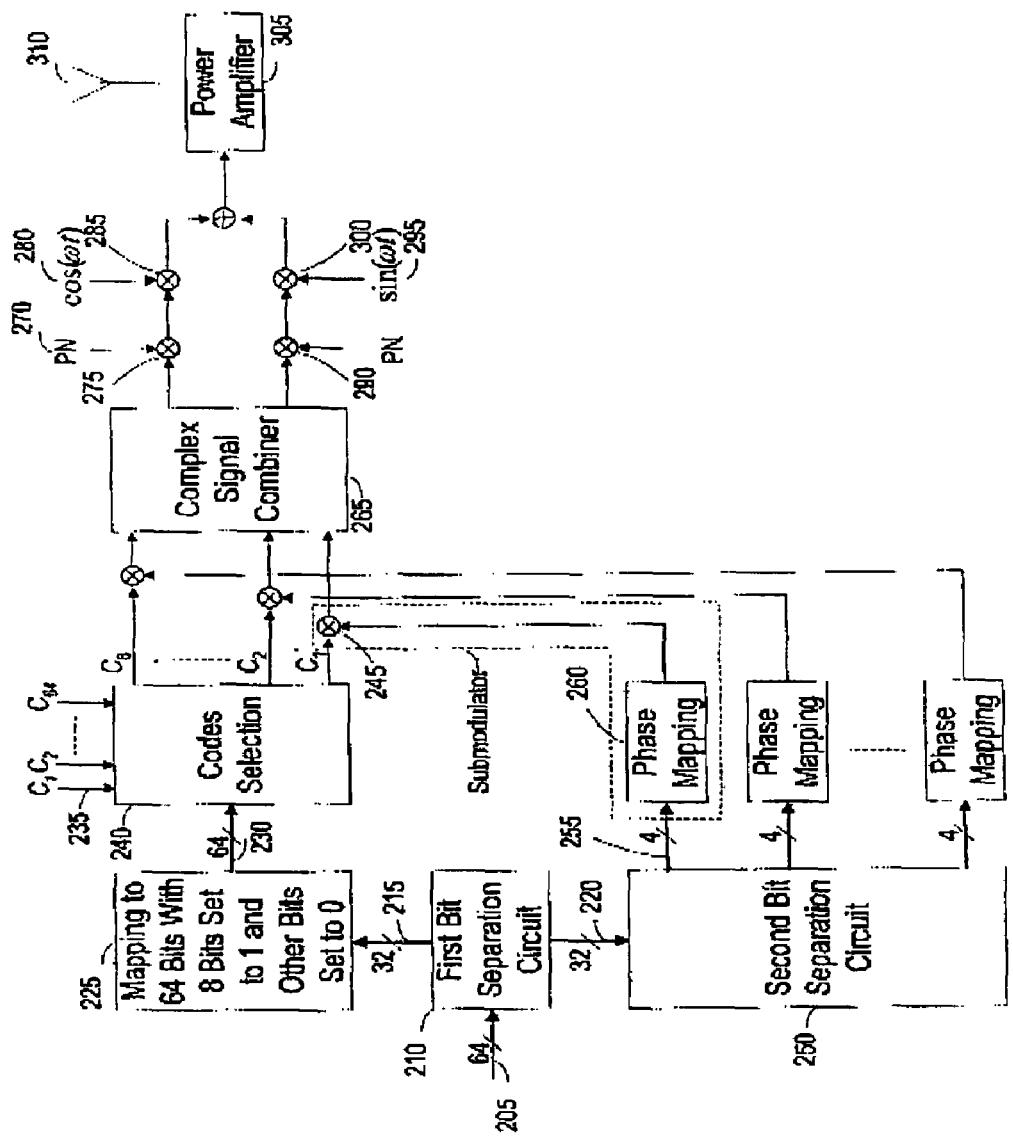
FIG. 2 is a block diagram of the transmitter of a multi-channel direct sequence spread spectrum communications system implementing concepts of the present invention.

FIG. 2 illustrates the transmitter of a multi-channel direct sequence spread spectrum communications system implementing the concept of power set.

In a multi-channel direct sequence spread spectrum communications system such as the one described in U.S. Pat. No. 6,324,209, each of the transmitted spreading codes may carry information by itself. Suppose in the system described by in U.S. Pat. No. 6,324,209, there are 64 codes separated into 8 groups with 8 codes in each group. Further suppose each code can have 16 different phases. Then during each symbol period, 8·(3+4)=56 bits could be transmitted. Using the concept of power set, it is possible to transmit more bits with only 8 codes transmitted at any time.

The total combinations to choose 8 codes from 64 codes are $C_{64}^8 = 4,426,165,368$. Since $C_{64}^8 > 2^{32} = 4,294,967,296$, from a given 8 codes, 32 bits can be obtained from reverse mapping. Also 4 bits can be obtained from the phase associated with each code of the 8 codes. Therefore a total of 32+8*4=64 bits can be transmitted.

There are $2^{64} - C_{64}^8$ extra elements in the power set $2^S$ which have not been used yet. These extra elements could be used for signaling, such as using one extra element to indicate no symbol repetition, another extra element to indicate 1 symbol repetition, a third extra element to indicate 2 symbol repetitions. A transmitter transmits an extra element corresponding to the desired symbol repetition. A receiver, after detecting the extra element, is able to find the intended symbol repetition set up by the transmitter.

Among these extra elements, there are 4,426,165,368−4,294,967,296=131,198,072 elements with 8 codes in each element and there are $$\sum_{i=1}^{7} C_{64}^i = 704,494,192 \text{ elements}$$

with 7 or less codes in each element. If only the extra elements with exactly 8 codes in each element are used for signaling, the energy associated with each code of the element for signaling will be equal to the energy associated with each code of the element used for information transmission. If the extra elements with less than 8 codes in each element are used for signaling, the energy contained in each code for signaling will be larger than the energy in each code for information transmission. Therefore, more reliable signaling can be provided when the extra elements with fewer codes are used for signaling.

Suppose on the data bus 205, there are 64 bits needed to be transmitted simultaneously. The bit separation device 210 separates bus 205 into two data buses 215 and 220 with each bus having 32 bits. The mapping device 225 maps the 32 bits on data bus 215 into 64 bits with 8 bits set to 1 and the other bits set to 0.

There are many way of mapping 32 bits into 64 bits with 8 bits set to 1 and the other bits set to 0. The simplest mapping algorithm for the mapping device 225 could be done as following. First, list the entire binary table for 64 bits in ascending order. Then delete all the items which do not include exactly 8's 1 and 56's 0. Next, start from beginning, map each of the 64 bits of the remaining first $2^{32}=4,294,967,296$ items to a 32 bits sequence 0 . . . 000, 0 . . . 001, 0 . . . 010, 0 . . . 011, . . . , 1 . . . 111 correspondingly.

Set 235 consists of 64 codes denoted $C_1, \ldots, C_{64}$. The code selection device 240 select codes according to corresponding bit on the data bus 230. If a bit on the data bus 230 is 1, the corresponding code will be selected. Exactly 8 codes will be selected and they are denoted as $C'_1, C'_2, \ldots, C'_8$.

Data bus 220 is connected to bit separation circuit 250, where the 32 bits are further divided into 8 groups with each group having 4 bits on each data bus 255. The phase mapping device 260 maps each of the 4 bits on data bus 255 into a complex number which corresponds to one of the 16 possible phase of a 16PSK signal. Each of these 8 complex numbers is multiplied with $C'_1, C'_2, \ldots, C'_8$ by one of the multipliers 245 respectively. The complex signal combiner 265 adds all the 8 complex products of the output of multipliers 245 together and then separates the real signal and image signal as I and Q. The I signal is multiplied by PN code 270, modulated by $\cos(\omega t)$; Q signal is multiplied by PN code 270, modulated by $\sin(\omega t)$. Both I and Q are coupled together, then sent to power amplifier 305 for amplification, and then to antenna 310 for transmission.

Figure 3:
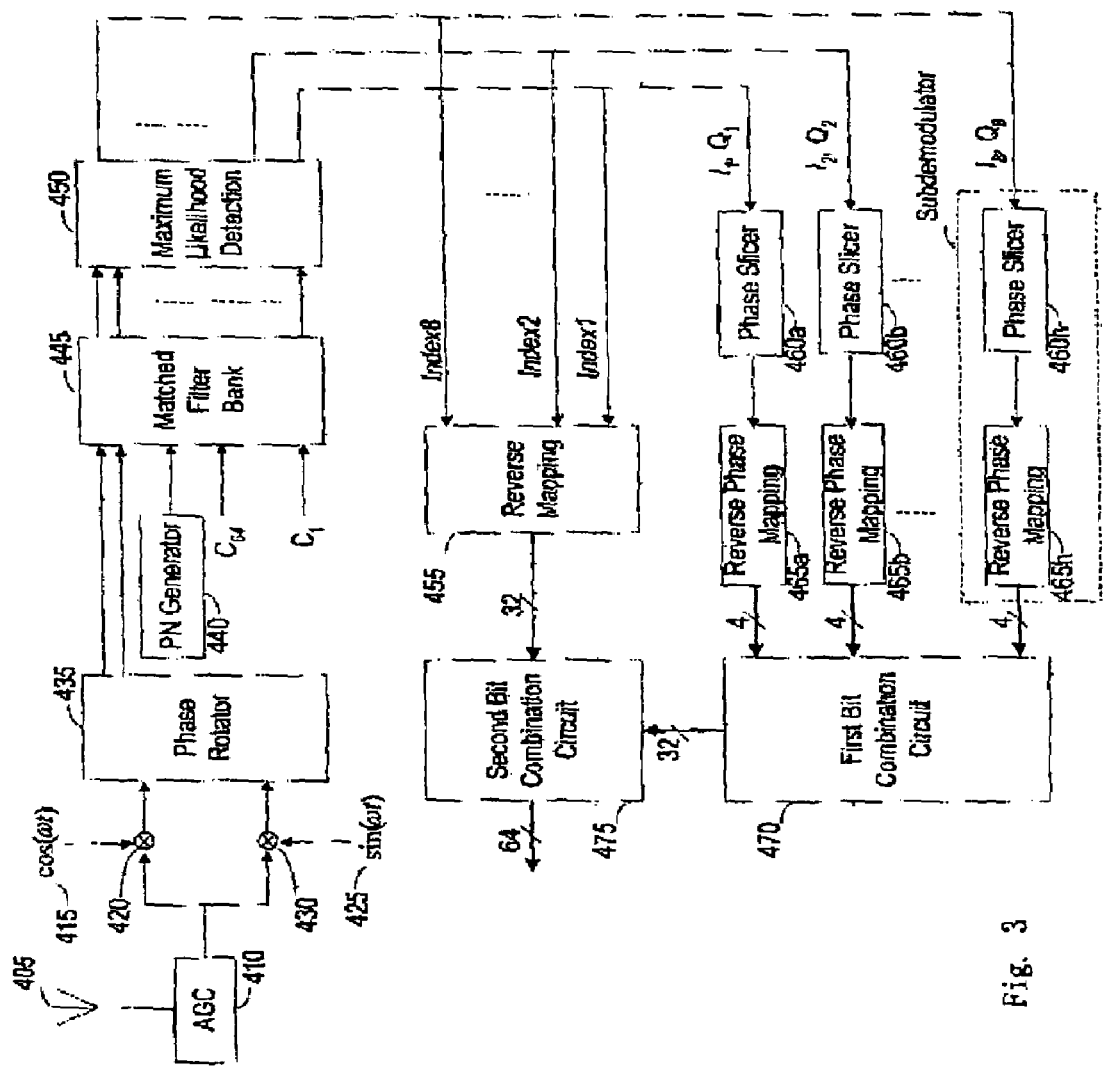
FIG. 3 is a block diagram of the receiver of a multi-channel direct sequence spread spectrum communications system implementing concepts of the present invention.

FIG. 3 illustrates the receiver of a multi-channel direct sequence spread spectrum communications system implementing the concept of power set.

The signal enters the receiver through the antenna 405 and goes through the voltage controlled amplifier (AGC) 410. The output of AGC 410, is multiplied by $\cos(\omega t)$ 415 at multiplier 420 and by $\sin(\omega t)$ 425 at multiplier 430. The phase rotator 435 is used to correct the phase error. The PV code from the PN generator 440 and all the spreading codes $C_1, \ldots, C_{64}$ are fed to the matched filter bank 445, which is used to find that how closely the input signal is matched with each of spreading codes $C_1, \ldots, C_{64}$ scrambled by PN code. The maximum likelihood detection device 450 will determine 8 most likely transmitted codes. Device 450 has 8 groups of output with each group of output consisting of an I component, a Q component and the index of corresponding code. Index i<Index j for i<j.

The 8 indexes with one from each group are fed to the reverse mapping device 455 to obtain 32 data bits, which should be same as the one on data bus 215 in FIG. 2 if no error is made.

The I and Q signals from each group are fed to one of the 16PSK slicers as denoted by 460a through 460h, which selects the most likely transmitted phases among the 16 possible phases. The outputs of these phase slicers are sent to the reverse phase mapping devices 465a to 465h to obtain the remaining 4 bits from each. The bit combination device 470 combines the 4 bits from each of the 8 reverse phase mapping devices to form demodulated 32 data bits, which should be identical to the bits on the data bus 220 of FIG. 2.

The combiner 475 combines the 32 bits form the bit combination 470 and the 32 bits from the reverse mapping device 455 to form a total of 64 demodulated bits. If no error occurs during transmission, the demodulated bits should be identical to the 64 bits on the data bus 205 in FIG. 2.

FIG. 2 and FIG. 3 show a transmitter and a receiver respectively according to a subset of a power set whose elements in the subset have same number of spreading codes. One skilled in the art can easily extend the basic ideas shown in FIG. 2 and FIG. 3 to more general situation with a subset including any selected elements of the power set. Since two elements in the power set could include different number of spreading codes, in order to make sure each spreading code modulated by a same M-ary PSK scheme or any other same modulation scheme, the blocksize of data bits transmitted and received each time could change. To handle this case properly, one could define a mapping scheme that maps a block of data bits into an element of the power set with every block of data bits having a same blocksize. Depending on the number of components in an element and a particular modulation scheme used, an extra block of data bits with more or less data bits will be taken for conducting the modulations on all the components of that element. The mapping scheme could further define an associating relationship between every component of that element and a corresponding portion of data bits in that extra block of data bits. The corresponding portion of data bits will be used to perform a modulation, such as an M-ary PSK, on that particular component. The size of each block of data bits for determining the selection of an element of power set is fixed while the size of extra block of data bits is variable. In this way, each element associates with two types of blocks. The first type of block has a fixed content and is for determining which element will be selected. All first blocks have a same blocksize. The second type of block is for conducting modulation on all components of an element. Since the blocksize of a second block depends on the number of the components in an element and the modulation scheme, two different second blocks may have different blocksizes. A second type block may change its content but its blocksize will not change. To distinguish the blocks taken from the data stream from the blocks used as templates in a mapping scheme, one can call a first block in the mapping scheme as a first block template and a second block in a mapping scheme as a second block template.

What is claimed is:

1. A communication system having a plurality of transmittable signals with each subset of said plurality of transmittable signals is an element of a power set of said plurality of transmittable signals, said system comprising:
    a mapping device at a transmitter for mapping a first block of data bits into an element of said power set according to a predefined mapping scheme, wherein said transmitter transmits said element into a transmission link;
    a detection device at a receiver for determining a likely transmitted element of said power set from said transmission link; and
    a reverse mapping device at said receiver for reversely mapping said likely transmitted element into a second block of data bits according to said predefined mapping scheme,
    whereby said first block of data bits is identical to said second block of data bits in a noise-free and interference-free environment.

2. The communication system as in claim 1, wherein said plurality of transmittable signals is a plurality of spreading codes.

3. The communication system as in claim 1, wherein said plurality of transmittable signals is a plurality of signals centered at different frequencies.

4. The communication system as in claim 1, wherein said plurality of transmittable signals is a plurality of signals transmitted at different time slots.

5. The communication system as in claim 1, wherein said plurality of transmittable signals are a plurality of signals different from each other at least at one category selected from a group consisting of frequency and time slot.

6. The communication system as in claim 1, wherein said plurality of transmittable signals are a plurality of signals different from each other at least at one category selected from a group consisting of orthogonal code, frequency, and time slot.

7. The communication system as in claim 1, wherein each transmittable signal has a same amount of power, said predefined mapping scheme letting a block of data bits having higher probability of usage correspond to an element of said power set with a smaller number of transmittable signals for saving power.

8. The communication system as in claim 1, wherein each element of said power set has a same amount of power, said predefined mapping scheme letting a block of data bits corresponding to an important message be associated with an element of said power set with a smaller number of transmittable signals for increasing probability to detect said important message correctly.

9. The communication system as in claim 1, wherein said predefined mapping scheme specifies a particular subset of said power set, each element of said particular subset comprising a same number of transmittable signals.

10. A communication system having a plurality of orthogonal codes, said system transmitting a block of data bits by sending an element of a power set of said plurality of orthogonal codes over a communication link, wherein said element belongs to a subset of said power set with each element of said subset having a same number of orthogonal codes, said system comprising:
a transmitting subsystem, said transmitting subsystem including,
a first bit separating device for dividing said block of data bits into a first block of data bits and a second block of data bits;
a first mapping device for generating a selecting signal according to said first block of data bits and a predefined mapping scheme;
an orthogonal code selection device for selecting a particular element from said power set according to said selecting signal;
a second bit separating device for dividing said second block of data bits into a plurality of smaller blocks of data bits;
a plurality of second mapping devices with each second mapping device for mapping each smaller block of data bits into a modulating signal;
a plurality of sub-modulators for generating a plurality of modulated signals with each sub-modulator modulating a corresponding orthogonal code of said particular element by a corresponding modulating signal; and
a signal combiner for combining said plurality of modulated signals, and
a receiving subsystem, said receiving subsystem including,
a correlation device for determining energy associated with each orthogonal code;
a detection device for determining most likely a plurality of active orthogonal codes according to energy associated with each orthogonal code and said predefined mapping scheme;
a first reverse mapping device for generating an estimated first block of data bits according to said plurality of active orthogonal codes and said predefined mapping scheme;
a plurality of sub-demodulators for generating a plurality of estimated modulating signals with each sub-modulator demodulating an active orthogonal code;
a plurality of second reverse mapping devices for generating a plurality of estimated smaller blocks of data bits with each second reverse mapping device reversely mapping a corresponding estimated modulating signal;
a first bit combination device for combining said plurality of estimated smaller blocks of data bits into an estimated second block of data bits; and
a second bit combination device for combining said estimated first block of data bits with said estimated second block of data bits to generate estimated block of data bits,
whereby said estimated block of data bits is identical to said block of data bits in a noise-free and interference-free environment.

11. The communication system as in claim 10, wherein each sub-modulator comprises an M-ary PSK modulator and wherein each sub-demodulator comprises an M-ary PSK demodulator.

12. The communication system as in claim 10, wherein each sub-modulator comprises a QAM modulator and wherein each sub-demodulator comprises a QAM demodulator.

13. The communication system as in claim 10, wherein each sub-modulator comprises a PAM modulator and wherein each sub-demodulator comprises a PAM demodulator.

14. A communication system having a plurality of transmittable signals and sending a stream of data bits over a communication link by transmitting a plurality of working elements of a power set of said plurality of transmittable signals, wherein said plurality of working elements are a predefined subset of said power set for conducting transmission, said system comprising:
a mapping scheme for linking each working element with a different first block template, for associating said each working element with a second block template, and for connecting each transmittable signal of said each working element with a corresponding portion of said second block template, wherein said second block template has a plurality of portions with each portion corresponding to a respective transmittable signal of said each working element and with a blocksize determined by number of transmittable signals of said each working element and a modulation scheme to be used, and wherein each first block template has a same blocksize;
a transmitting subsystem, said transmitting subsystem including,
a means for taking a first block of data bits from said stream of data bits with a blocksize being equal to said same blocksize;
a first mapping device for mapping said first block of data bits into an element of said power set according to said mapping scheme;

a means for taking a second block of data bits with a blocksize determined by said mapping scheme and said element;

a bit separation device for separating said second block of data bits into a plurality of smaller blocks of data bits according to said mapping scheme;

a plurality of second mapping device for mapping said plurality of smaller blocks of data bits into a plurality of modulating signals according to said modulation scheme;

a plurality of sub-modulators for modulating each transmittable signal of said element by a corresponding modulating signal to generate a plurality of modulated signals; and a signal combiner for combining said plurality of modulated signals into a compound signal, wherein said compound signal is transmitted over said communication link;

a receiving subsystem, said receiving subsystem including, a detection device for determining energy associated with every possible transmittable signal and determining an estimated element of said power set;

a first reverse mapping device for reversely mapping said estimated element into a first estimated block of data bits according to said mapping scheme;

a plurality of sub-demodulators for demodulating each transmittable signal of said estimated element of said power set into a plurality of estimated smaller blocks of data bits;

a first bit combination device for combining said plurality of estimated smaller blocks of data bits into a second estimated block of data bits according to said mapping scheme;

a second bit combination device for combining said first estimated block of data bits and said second estimated block of data bits to generate an estimated block of data bits, whereby said estimated block of data bits is identical to combination of said first block of data bits and said second block of data bits in a noise-free and interference-free environment.

15. The communication system as in claim 14, wherein said plurality of transmittable signals is a plurality of signals centered at different frequencies.

16. The communication system as in claim 14, wherein said plurality of transmittable signals is a plurality of signals transmitted at different time slots.

17. The communication system as in claim 14, wherein said plurality of transmittable signals are a plurality of signals different from each other by at least one category selected from a group consisting of frequency and time slot.

18. The communication system as in claim 14, wherein said plurality of transmittable signals are a plurality of signals different from each other by at least one category selected from a group consisting of orthogonal code, frequency, time slot.

19. The communication system as in claim 14, wherein said predefined mapping scheme lets a block of data bits having higher probability of usage correspond to an element of said power set with a smaller number of transmittable signals for saving power when each transmittable signal has a same amount of power and wherein said predefined mapping scheme lets a block of data bits corresponding to an important message be associated with an element of said power set with a smaller number of transmittable signals for increasing probability to detect said important message correctly when each element of said power set has a same amount of power.

20. The communication system as in claim 14, wherein each modulating device and each demodulating device are for modulating and demodulating respectively a signal belonging to a same category selected from a group consisting of M-ary PSK, M-ary QAM, and M-ary PAM.

* * * * *